(12) United States Patent
Tananaev

(10) Patent No.: US 12,450,920 B2
(45) Date of Patent: Oct. 21, 2025

(54) METHOD OF DETECTING AT LEAST ONE TRAFFIC LANE MARKING AND/OR ROAD MARKING IN AT LEAST ONE DIGITAL IMAGE REPRESENTATION

(71) Applicant: Robert Bosch GmbH, Stuttgart (DE)

(72) Inventor: Denis Tananaev, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

(21) Appl. No.: 18/153,753

(22) Filed: Jan. 12, 2023

(65) Prior Publication Data

US 2023/0230395 A1   Jul. 20, 2023

(30) Foreign Application Priority Data

Jan. 18, 2022  (DE) ..................... 10 2022 200 515.5
Dec. 22, 2022  (DE) ..................... 10 2022 214 341.8

(51) Int. Cl.
*G06V 20/56*   (2022.01)
*G06T 9/00*    (2006.01)
*G06V 10/82*   (2022.01)

(52) U.S. Cl.
CPC .............. *G06V 20/588* (2022.01); *G06T 9/00* (2013.01); *G06V 10/82* (2022.01)

(58) Field of Classification Search
None
See application file for complete search history.

(56) References Cited

U.S. PATENT DOCUMENTS

| 9,056,630 B2 | 6/2015 | Han et al. |
| 2020/0013154 A1 | 1/2020 | Jang |
| 2021/0342608 A1 | 11/2021 | Smolyanskiy et al. |
| 2021/0406560 A1* | 12/2021 | Park ........................ G06T 7/70 |
| 2023/0050467 A1* | 2/2023 | Govardhanam .......... G06T 5/50 |

FOREIGN PATENT DOCUMENTS

| DE | 112021000135 T5 | 6/2022 |
| EP | 3624001 A1 | 3/2020 |
| KR | 20180019921 A | 2/2018 |
| WO | WO-2021175434 A1 * | 9/2021 ....... G06F 18/24137 |

OTHER PUBLICATIONS

Deng, et al.: "Restricted deformable convolution-based road scene semantic segmentation using surround view cameras," IEEE Transactions on Intelligent Transportation Systems, 21(10), (2019), pp. 4350-4362; doi: 10.1109/TITS.2019.2939832.

* cited by examiner

*Primary Examiner* — Edemio Navas, Jr.
(74) *Attorney, Agent, or Firm* — NORTON ROSE FULBRIGHT US LLP

(57) ABSTRACT

A method of detecting at least one traffic lane and/or a roadway marking in at least one digital image representation based on sensor data obtained from at least one environmental sensor of a system. The method includes: a) obtaining a plurality of digital image representations each containing a plurality of features representing the respective image content, b) applying a bird's eye view transformation to the obtained digital image representations, wherein each of the digital image representations is transformed separately so as to create transformed digital image representations, c) performing a consolidation of the transformed digital image representations to obtain a consolidated digital image representation.

8 Claims, 5 Drawing Sheets

METHOD OF DETECTING AT LEAST ONE TRAFFIC LANE MARKING AND/OR ROAD MARKING IN AT LEAST ONE DIGITAL IMAGE REPRESENTATION

CROSS REFERENCE

The present application claims the benefit under 35 U.S.C. § 119 of German Patent Nos. DE 10 2022 200 515.5 filed on Jan. 18, 2022, and DE 10 2022 214 341.8 filed on Dec. 22, 2022, which are expressly incorporated herein by reference in their entireties.

FIELD

The present invention relates to a method for detecting at least one lane and/or roadway marking in at least one digital image representation, in particular based on sensor data obtained from at least one environmental sensor of a system, advantageously of a vehicle.

BACKGROUND INFORMATION

Current deep learning approaches for lane detection can be broken into two method groups. The first group of approaches utilizes semantic segmentation for the problem of roadway marking detection.

The semantic segmentation is based on gaining understanding of an image at pixel level. Preferably, a label or category is associated with each pixel of an image. Deep learning is used to recognize a compilation of pixels that form different categories.

In this regard, roadway markings may be presented as a semantic segmentation task. Roadway markings may be detected based on their characteristic color. While this approach can deliver high quality results, it has the disadvantage that high computational costs are incurred due to dense pixel prediction (high number of pixels in the commonly used high resolution camera images).

The second group of approaches is so-called line-by-line classification approaches. These function, for example, such that a camera image is divided into a number of lines or cells to which classifications are applied. Unlike semantic segmentation, the line-by-line classification approaches can provide quick conclusions, but are not very effective.

Another limitation of the current approaches is that they operate at the image level. In order to obtain 3D-tracks, it has been proposed to perform an Inverse Prospective Mapping (IPM) which may cause additional errors due to the assumption of a level ground.

SUMMARY

An object of the present invention is to at least partially solve the problems described with reference to the related art. This object may be achieved with the features of the present invention. Further advantageous configurations and embodiment of the present invention are disclosed herein. It should be noted that the skilled person may combine the individual features together in a technologically sensible manner and thus arrives at further configurations of the present invention.

According to the present invention, a method is described for detecting at least one lane and/or a roadway marking in at least one digital image representation, particularly based on sensor data obtained from at least one environmental sensor of a system, advantageously of a vehicle. According to an example embodiment of the present invention, the method comprises at least the steps of:

a) obtaining a plurality of digital image representations advantageously each containing a plurality of features representing the respective image content,
b) applying a bird's eye view transformation to the obtained digital image representations, wherein advantageously each of the digital image representations is transformed separately so as to create transformed digital image representations,
c) consolidating the transformed digital image representations to obtain a consolidated digital image representation.

Compared to the related art, the approach of the method of the present invention described here is to not perform the detection of road markings at the image level, but rather to merge a plurality of images (digital image representations) and transform them into a common coordinate system in which a 3D image data file is prepared. Image data are obtained in step a) and then transformed into a common ground based coordinate system in step b) through the bird's eye view transformation, in which the individual image contents are shown from a bird's eye view. When the ground around a vehicle is viewed as an image plane, for example, the ground as seen in the individual image representations is depicted in the individual transformed image representations according to step c). The image representations are then consolidated in step c). That is, are transferred to a common data structure.

The bird's eye view transformation is a transformation in which a camera image taken with a direction of view from slightly above the ground is transformed such that the image content depicted in the camera image is shown on a ground plane (in a ground-based coordinate system). In order to perform the bird's eye view transformation, data about the direction of view of the camera and the position of the camera (in particular the height of the camera) are usually required. Typically, the ground section captured by a camera pointed obliquely downwards is approximately trapezoidal. Close to the camera, the visible area of the ground is narrower than further to the rear. However, the resolution is significantly higher close to the camera.

For example, if multiple image representations exist of the ground around a vehicle, road markings and/or traffic lanes in the image representations may be seen partially doubled or overlapping. Some errors may also exist in that road markings are depicted in an image representation at slightly different position from another image representation. For example, portions of a roadway marking are visible in one image representation that are also visible in another image representation, but at a distance from each other. Such errors may arise, for example, from computational errors in the transformations or orientational inaccuracy of cameras that captured the image data. By merging such image representations into a common consolidated image representation in step c), such errors are preferably corrected. This may be done, for example, by assuming averaged image positions for certain features from the various image representations.

According to an example embodiment of the present invention, it is particularly advantageous when each digital image representation comprises a compilation of features or is provided in the form of a feature compilation.

The term "feature map" is also used for the term "feature compilation".

This refers to the digital image representation obtained in step a). A "feature map" means a description of the image representation in which the image is already partially analyzed or in which features are detected. Preferably, individual features are detected in the image representations and stored in the form of the "feature map". This also includes image constituents that may later be detected as traffic lanes and/or road markings. Image representations are therefore preferably not directly pure camera images, but may already be pre-processed. It is possible that the image representation is a combination of raw image data and the feature compilation. It is also possible that the image representation only comprises the feature compilation and that the raw image data are already removed from the image representation or are no longer included in the image representation.

However, explicit detection of traffic lanes or roadway markings does not yet occur with the pre-processing prior to step a). Such features are performed only after application of the bird's eye view transformation and the consolidation (steps b) and c)). The approach of the method described herein is that the detection of traffic lanes and/or roadway markings will ultimately take place in two parts. Detection of features in digital image representations/image contents occurs already before the bird's eye view transformation. The evaluation of the image representation/image contents or of the feature information already extracted from the images, in order to detect traffic lanes and/or roadway markings, is then performed after the bird's eye view transformation in the consolidated image representation in a ground-based coordinate system.

According to an example embodiment of the present invention, the method is further particularly advantageous when each digital image representation is obtained from a digital image, advantageously by encoding a plurality of digital images, which are received in particular from a plurality of digital cameras.

Thus, preferably, the digital image representations obtained in step a) also already constitute information compiled from a plurality of digital images. If applicable, neural networks may also already have been used to form the digital image representations from a plurality of digital images or to bring the information from the plurality of digital images together to form the digital image representation.

The fusion of the traffic lanes captured by individual cameras to a common world representation can result in alignment errors caused by errors inside or outside of the cameras.

In an advantageous embodiment of the present invention, an end-to-end multi-camera fusion using a convolutional neural network (CNN, CNN=Convolutional Neural Network) may solve the problem of alignment errors. Advantageously, the present invention may avoid the limitations of the previous methods by directly inferring the traffic lanes in 3D coordinates and may be trained for multi-camera systems end-to-end. This makes the approach highly efficient and scalable compared to the related art, since no computationally intensive post-processing is required for 3D lane detection.

Preferably, in the described method of the present invention, convolutional neural networks are applied to the individual image contents/image representations prior to performing the bird's eye view transformation as well as in the consolidation of the transformed digital image representations after the bird's eye view transformation, as well as then also to identify the traffic lanes/roadway markings in the consolidated digital image representation.

The convolutional neural network is, in particular, an artificial neural network developed in software having a plurality of computer-implemented nodes arranged in layers one after another, wherein as input into the network, for example, the digital image representation is processed and then the layers successively process output data of previous layers.

Generally, the structure of a classical convolutional neural network is made up of one or more levels, followed by a pooling layer. In principle, this unit can repeat as many times as desired, and with sufficient repetitions, the neural network is then referred to as a "deep" convolutional neural network.

In a convolutional neural network, closely adjacent regions of an image are respectively processed together to detect patterns. By using so-called pooling layers, superfluous information is discarded.

Training of such convolutional neural networks is achieved by the feedback of desired results. The weightings of the nodes within the network are adjusted as a function of the feedbacks. Through training, the neural network may be set to accomplish the intended task (here, the detection of roadway markings and traffic lanes in an totality of image contents).

According to an example embodiment of the present invention, the method is particularly advantageous when a deep learning algorithm is used to perform at least a portion of the method, preferably wherein the deep learning algorithm is implemented using at least one artificial neural network, advantageously at least one convolutional neural network (CNN).

Particularly preferably, the deep learning algorithm is applied to processing the image data prior to performing the bird's eye view transformation and/or for the consolidation of the transformed digital image representation, in order to obtain a consolidated digital image representation.

Moreover, it is preferred if each digital image representation is obtained by means of a convolutional neural network encoder (CNN encoder).

In addition, it is preferred if the digital image representations are concatenated over a common height dimension, particularly during transformation.

In addition, it is preferred if the consolidation of the transformed digital image representations comprises a decoding with preferably a convolutional neural network (CNN decoder; CNN=convolutional neural network decoder).

In one advantageous embodiment of the present invention, the present invention relates to detecting continuous roadway markings from the bird's eye view with multiple cameras for autonomous driving with convolutional neural networks.

The present invention may comprise at least one or more of the following aspects:
- The present invention provides the advantage of a precise and/or robust parametric representation of roadway marker detection in the 3D bird's eye view.
- The present invention advantageously describes the application of end-to-end CNN with transformation from the bird's eye view to the problem of roadway marking detection.
- The present invention may generate a unitary 360 degree representation of roadway markings for systems having multiple camera views.
- The correction of alignment errors caused by IPM and camera calibration errors is advantageous, especially by using the loss function both in the local view per camera and in the global 360° view.

The present invention may contribute to at least one or more of the following advantages:

In contrast to conventional methods that operate in the image area and require additional post-processing to extract roadway markings in 3D, the present invention can in particular continuously apply the inference directly in the 3D area, which advantageously reduces computational effort and enables use in embedded systems.

The present invention may advantageously contribute toward fusing the input of multi-camera systems to form a high-quality 360 degree representation of the world, which may be used directly by systems for behavior prediction and/or movement planning.

A CNN architecture can be used that includes mathematical operations that can advantageously be supported by embedded hardware so that they can be used directly for next generation ADAS systems.

In one advantageous embodiment, the present invention may be used to detect and/or recognize the type of roadway markings and/or may be used in a driver assistance system and/or autonomous driving system and/or in HD map generation and/or in roadway marking condition monitoring.

Particularly in self-driving car systems, it is advantageous to (automatically) detect roadway markings as they can help identify driving rules that can be used for path planning and/or behavior prediction and/or location of ego vehicles.

The current traffic lane detection algorithms are normally applied to the image area and require post-processing and cross-camera fusion to obtain a clean 360 degree representation of the roadway markings. According to a preferred embodiment of the present invention, and in particular in contrast to the methods of the related art, it is proposed to perform a direct inference in 3D space. This can be applied to a single or multiple camera system.

An advantageous embodiment of the method according to the present invention may comprise at least one or more of the following steps:
- Images from multiple cameras may be processed by a CNN decoder, particularly with common parameters and/or output features.
- For each resulting feature, a separate module may be applied for the transformation from the bird's eye view (BEV).
- The resulting BEV features may be concatenated by the encoder, particularly across the high dimension, and/or a decoder CNN may be used.
- An IPM resampling can be applied to convert the output of the CNN into a global grid representation of the environment, particularly in the Cartesian coordinate system.
- Advantageously, in the training time, the loss can be applied to the full 360 grid view and/or in the test time, suppression of non-maxima can be applied to the 2D box detector to retain only valid bounding boxes containing the resulting 3D point samples of the traffic lanes, which can then be approximated by clothoid (or other suitable spline function).

A configured computer program for performing a described method(s) of the present invention is also to be described herein.

Moreover, a machine-readable storage medium according to the present invention, on which the computer program is stored, is to be described.

In addition, an object detection system for a vehicle is to be described, wherein the system is configured to perform the described method of the present invention.

It should be noted that the particular advantages and design features described in connection with the above-described method of the present invention are also transferable to the computer program and the object detection system of the present invention.

The present invention and the technical environment of the present invention are explained in further detail below with reference to the figures. The figures show preferred embodiment examples to which the present invention is not limited. It should in particular be noted that the figures, and in particular the scales shown in the figures, are only schematic.

DETAILED DESCRIPTION OF EXAMPLE EMBODIMENTS

Figure 1:
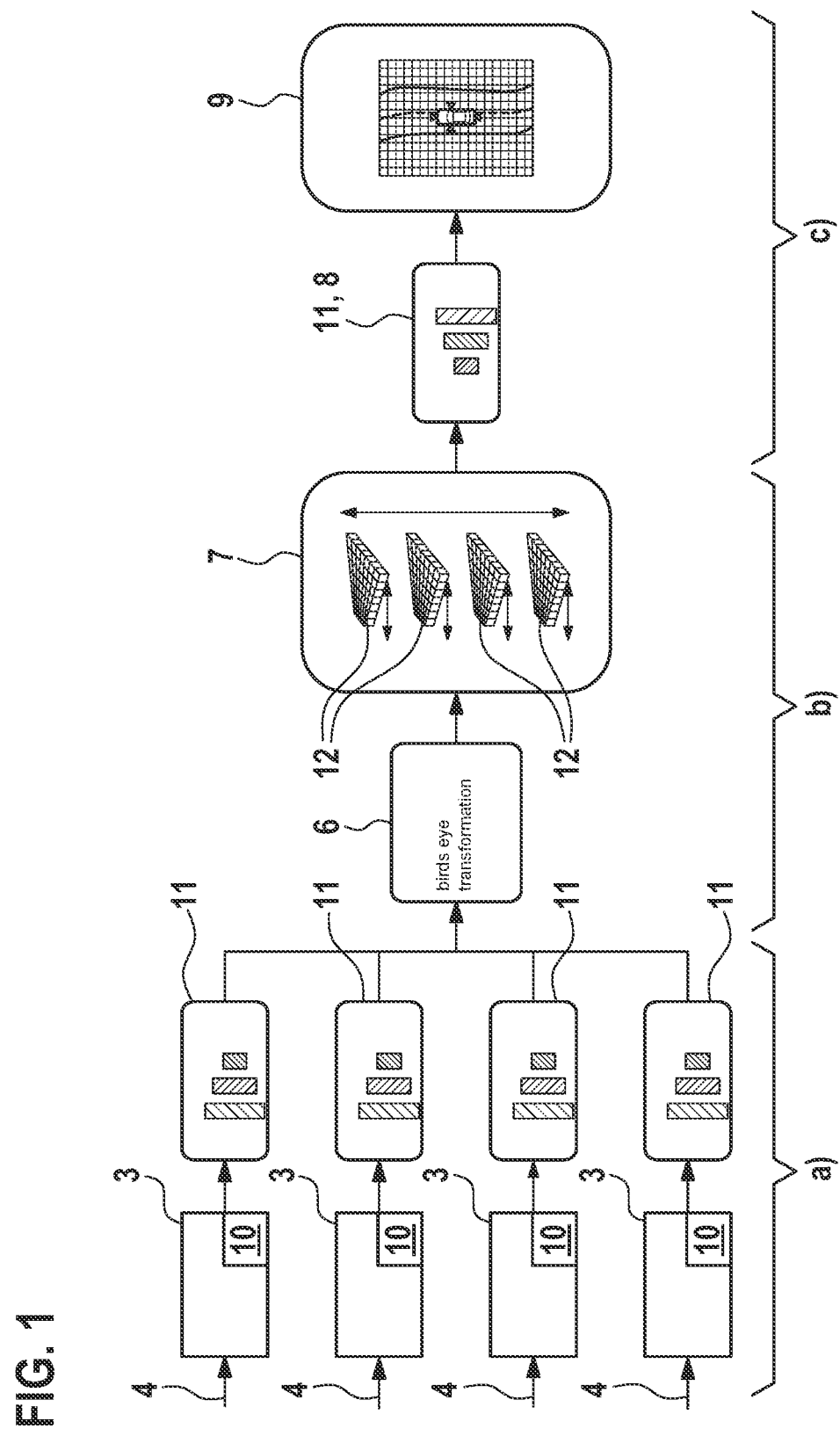
FIG. 1 shows a flowchart of the described traffic lane detection, according to an example embodiment of the present invention.

A preferred example of an overall pipeline for traffic lane detection with a representation from the bird's eye view is shown in FIG. 1.

Initially, individual digital image representations 3 are received. For example, the images from cameras are processed separately as sensor data 4 in an artificial neural network 11. The image data from cameras may in particular be raw image data. If applicable, feature compilations 10 that have already been detected or are detected with upstream filters may also be included. This corresponds to step a) of the described method.

The birds eye view transformation is then carried out so that digital image representations 12 transformed onto a ground plane 20 are created, which, however, respectively contain all information/features of the digital image representations 3. This corresponds to step b) of the described method. It is advantageous if the artificial neural networks 11 are used to process the feature compilations 10 respectively, such that the bird's eye view transformation 6 is applied to the feature compilations 10.

Subsequently, in step c), an application of an artificial neural network 11 to the individual transformed digital image representations 12 is performed anew, in order to merge these together to obtain a consolidated digital image representation 9.

The bird's eye view transformation includes, in particular, converting the digital image representations into a ground-based coordinate system. It may be performed according to a preferred embodiment as follows:

A series of convolutions staggered over the height dimension may be applied (or max/average pooling may be used, followed by a convolution), in particular followed by a non-linear activation function (e.g. ReLU) on a feature tensor of the form C×H×W, where C—number of the feature channels, H—height of the tensor, W—width of tensor, to reduce the height dimension to 1, but expand the feature dimension to C*Z, where C—the number of new features (may be different from the original tensor) and Z—depth discretization grid.

It shows an example of the discretization of the depth per 10 meters in bird's eye view). This advantageously results in a polar representation that may correspond to the plane that intersects the center of the camera (see, for example, FIG. 3, right part 3). The resulting tensor of the form C*Z×1×W can be converted into the tensor C×Z×1×W. By reducing the dimension of the height H to "1", it is expressed that the content of the digital image representations is reduced or projected to a ground plane 20.

Figure 2:
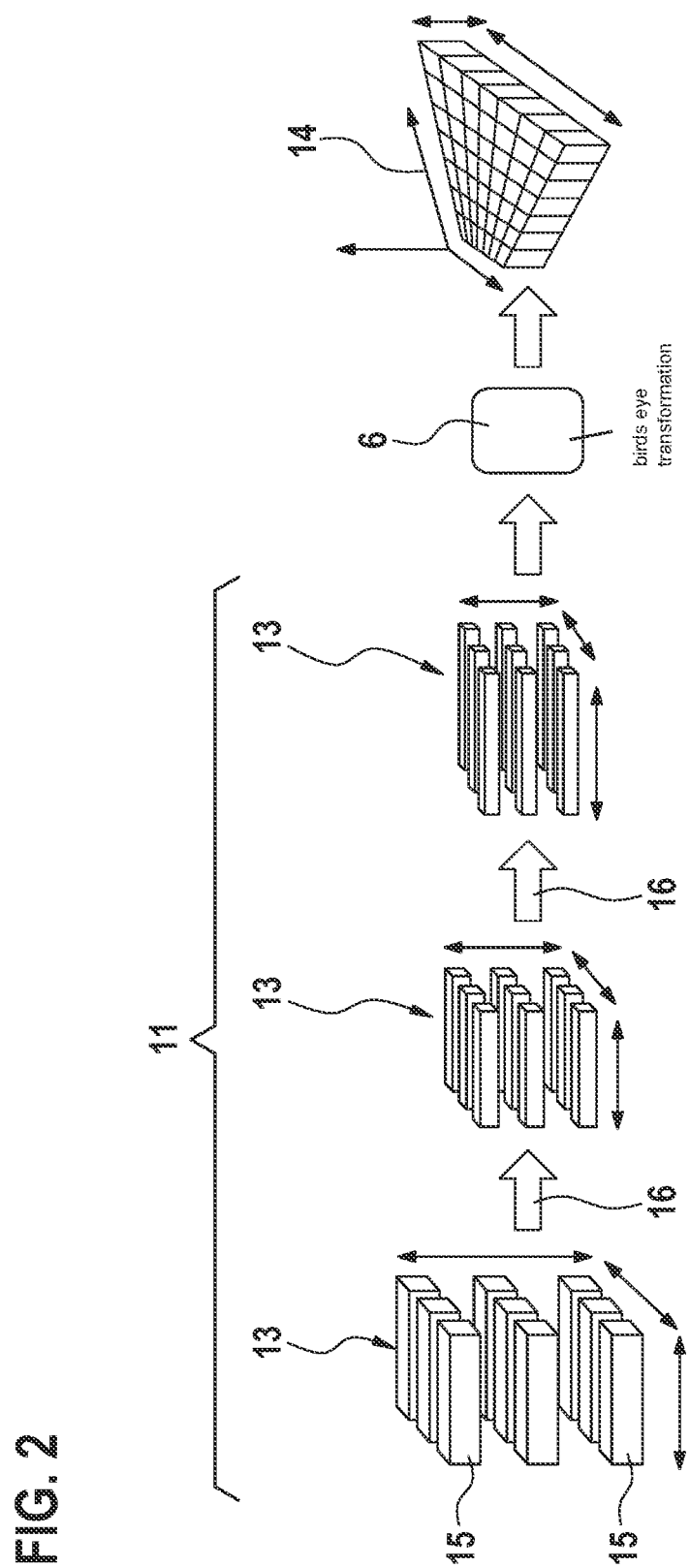
FIG. 2 schematically shows a sequence of processing in raw image data with a neural network and subsequent coordinate transformation for the described method of the present invention.

FIG. 2 illustrates in exemplary fashion how input data can be processed with an artificial neural network 11. Here, the processing of digital image representations followed by a bird's eye view transformation 6 is depicted, such that the digital image representations with the feature compilations included therein are represented in polar coordinates 14 in the bird's eye view coordinate system.

It is shown in FIG. 2 that the processing is performed in an artificial neural network 11 having a series of successively operating processing levels 13, each comprising artificial neurons 15. The artificial neurons 15 produce a dimensional reduction 16 from level to level. Here the dimension of the height is reduced ever further. Following the bird's eye view transformation, the content of the digital image representation is shown in polar coordinates 14.

In an advantageous next step, polar coordinates bird's eye view feature tensors for various cameras, particularly in the form C×Z×1×W, may be joined together via height dimensions and/or the resulting tensor C×Z×Number_Cameras×W may go to a CNN decoder, which may advantageously perform cross-camera feature blends for a global 360 degree lane representation, in particular around a vehicle 5 or automobile.

Preferably, the concatenated feature tensor may always have the same height dimension, especially because it corresponds to the number of cameras.

Figure 3:
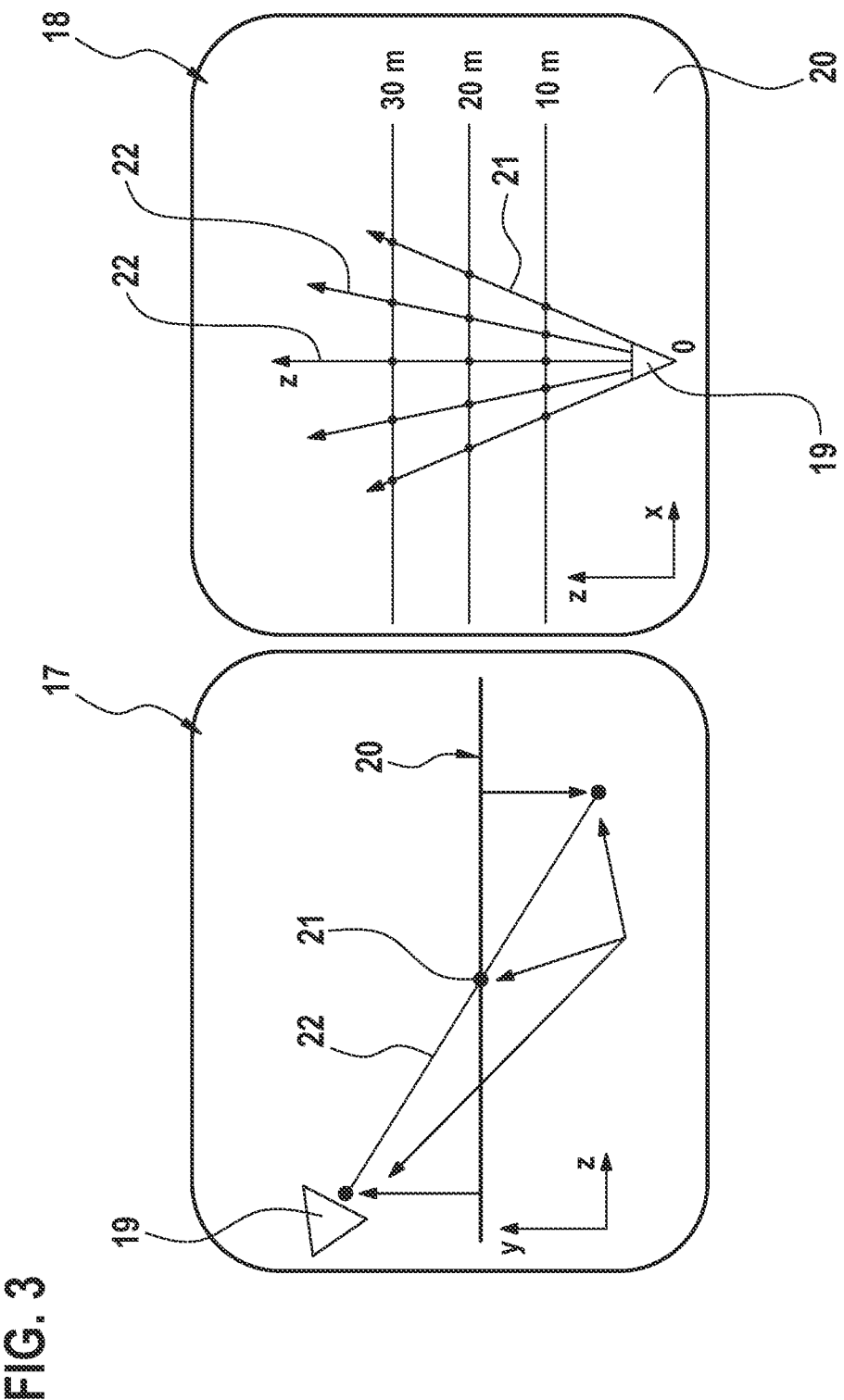
FIG. 3 schematically shows geometric properties of a bird's eye view transformation.

In FIG. 3, a cross-sectional view 17 through a digital image representation and the ground view 18 of the digital image representation are shown in comparison. Starting from the camera 19, in each case beam paths 22 are shown which strike points 21 on the ground. The ground view 18 shows where the sighted points 21 can be seen on the ground plane 20.

In an advantageous next step of the consolidation 8, a differentiable resampling can be applied to the output of the decoder to advantageously reconstruct the 360 degree global representation into Cartesian coordinates. For this purpose, the individual transformed digital image representations are merged into the consolidated digital image representation. The resampling may be performed using camera-internal and/or camera-external parameters. A virtual ground surface can be introduced onto which traffic lanes can be projected and/or an IPM transformation can be applied to the feature output of local camera polar coordinates on a global ground surface in 360 degree global coordinates.

Figure 4:
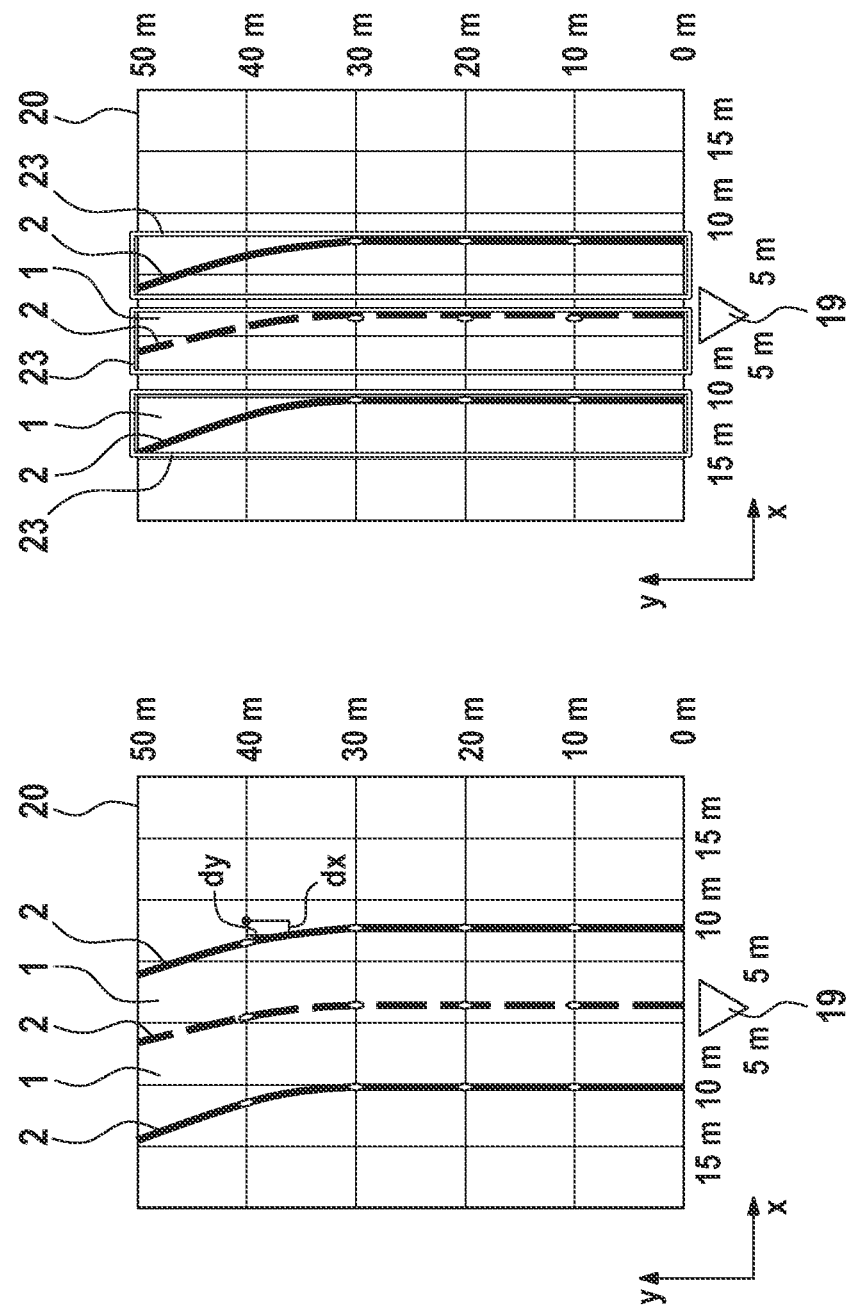
FIG. 4 schematically shows roadway markings as can be detected in transformed digital image representations, according to an example embodiment of the present invention.
Figure 5:
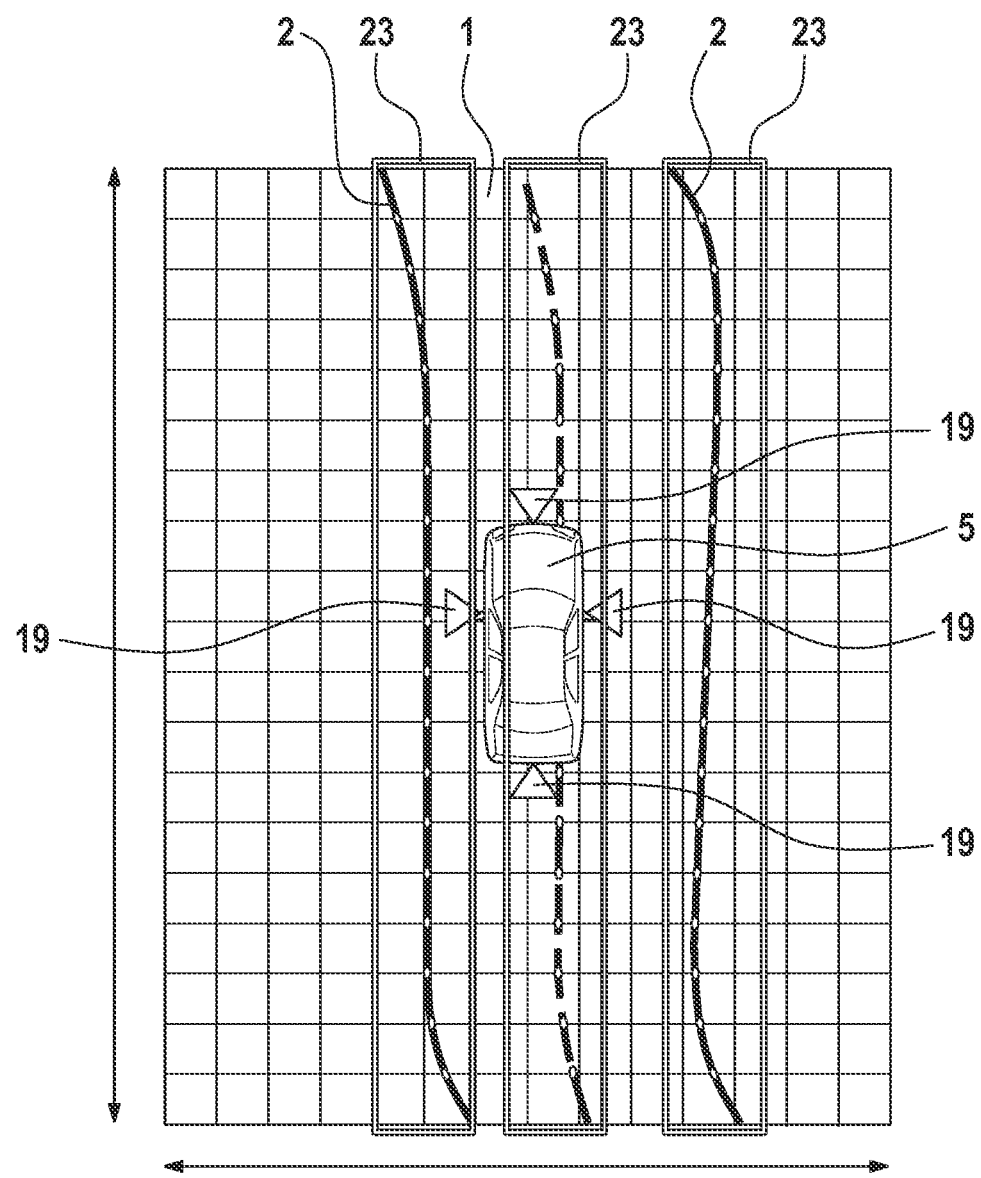
FIG. 5 schematically shows an environment of a vehicle in a transformed digital image representation with roadway markings, according to an example embodiment of the present invention.

Preferably, traffic lanes 1 and roadway markings 2 may be represented as a series of key points, the position of which may be regressed relative to local camera coordinates and/or 2D boxes, allowing for detection of which instance of regressed key points corresponds to the same line (see, e.g., FIG. 4 and FIG. 5).

A traffic lane key point may be represented as a feature vector with [confidence, dx, dy, z, class_label, 2d_box_height, 2d_box_width], where confidence is a binary value between 0 and 1, where 0 means that there is no key point and 1 means that there is a key point, dx and dy—the regressed offset of the exact position of the lane key point with respect to the nearest corner to the key point, class_label—corresponds to the type of line (e.g., monochrome lane, double lane, dashed lane, etc.). 2d_box_height and 2d_box_width correspond to the height and width of the box in the global 360 degree worldview. For example, this box may be used to detect traffic lanes. As each key point of the lane can provide its own box, the suppression of non-maxima can be applied to obtain final instances of the traffic lanes in the inference time. The final travel lane may be approximated by a parametric curve with given key points.

$$\text{Final\_line} = \text{approx\_spline}(p1, p2, p3, p4 \ldots) \quad (1)$$

Here Final_line—parametric curvature, approx_spline—the function approximating the spline in view of the amount of the points of the spline (for roadway markings the typical choice would be clothoid), p1, p2, p3, p4 . . . —key points that are regressed from CNN.

During a training of the artificial neural network, the binary cross entropy may be applied for the loss of confidence, particularly the l1 loss for the regression of all box parameters and/or the SoftMax loss for predicting classes. The confidence map may be calculated on the basis of ground guidelines. The cell closest to the traffic lane key points may be assigned as confidence 1.0 and otherwise 0. The confidence loss can be applied for all BEV pixels. Other losses can be applied only to the pixels where the confidence of ground truth is 1.0.

Summarized Once More

FIG. 1 schematically illustrates a preferred embodiment of an overview of the method as a whole.

FIG. 2 schematically illustrates a preferred embodiment of a transformation operation of the digital image representations from the individual perspectives into the polar coordinate system of the bird's eye view (to simplify the example, the same number of channels C is always used, which may also vary, however, with each convolution operation).

FIG. 3 schematically illustrates a preferred embodiment of a camera representation in the polar coordinate plane with depth grid discretization every 10 meters and projection of the roadway markings from the ground plane onto the camera polar coordinate plane. Here, the operation of the bird's eye view transformation can be understood.

FIG. 4 schematically illustrates a preferred embodiment of a parametric representation of the roadway markings in the single camera perspective in the Cartesian coordinate system (the same representation may also be applied in the polar coordinate system); to the left, the example representation of the key points; to the right, the example of the final predictive traffic lane instances with 2d feature windows 23 for traffic lanes 1 and roadway markings 2. ("bounding boxes").

FIG. 5 schematically illustrates a preferred embodiment of an example of the regression of the cross of the traffic lane markings for the BEV image 512×512 pixels; the key points of the traffic lane are regressed in the coordinate system of the local cameras, while the bounding boxes are regressed in the global image coordinates of the top view.

What is claimed is:
1. A method of detecting at least one traffic lane and/or a roadway marking in at least one digital image representation based on sensor data obtained from at least one environmental sensor of a system of a vehicle, the method comprising:
a) obtaining a plurality of digital image representations each containing a plurality of features representing respective image content;
b) applying a bird's eye view transformation to the obtained digital image representations, wherein each of the digital image representations is transformed separately so as to create transformed digital image representations; and
c) performing a consolidation of the transformed digital image representations to obtain a consolidated digital image representation;
wherein each of the digital image representations includes a feature compilation or is provided as the feature compilation, so that an artificial neural network is used to process the feature compilation, so that the bird's eye view transformation is applied to the feature compilation,
wherein the feature compilation is a feature map, which is a description of the digital image representation which is already partially analyzed and/or in which features are detected in the digital image representation and stored in the form of the feature map,
wherein the digital image representation is a combination of raw image data and the feature compilation, and
wherein detection of traffic lanes and/or roadway markings is performed only after the bird's eye view transformation and the consolidation of steps b) and c).

2. The method according to claim 1, wherein each of the digital image representations is obtained from a digital image, encoding a plurality of digital images from a plurality of digital cameras.

3. The method according to claim 1, wherein a deep learning algorithm is used to perform at least a portion of the method, wherein the deep learning algorithm is implemented using at least one artificial neural network, the artificial neural network including at least one convolutional neural network.

4. The method according to claim 1, wherein each of the digital image representations is obtained using an encoder having an artificial neural network.

5. The method of claim 1, wherein the digital image representations are concatenated over a common height dimension during the transformation.

6. The method according to claim 1, wherein the consolidation of the transformed digital image representations including a decoding with a convolutional neural network.

7. A non-transitory machine-readable storage medium, on which is stored a computer program, which is executable by a processor, comprising:
a program code arrangement having program code for detecting at least one traffic lane and/or a roadway marking in at least one digital image representation based on sensor data obtained from at least one environmental sensor of a system of a vehicle, by performing the following:
a) obtaining a plurality of digital image representations each containing a plurality of features representing respective image content;
b) applying a bird's eye view transformation to the obtained digital image representations, wherein each of the digital image representations is transformed separately so as to create transformed digital image representations; and
c) performing a consolidation of the transformed digital image representations to obtain a consolidated digital image representation;
wherein each of the digital image representations includes a feature compilation or is provided as the feature compilation, so that an artificial neural network is used to process the feature compilation, so that the bird's eye view transformation is applied to the feature compilation,
wherein the feature compilation is a feature map, which is a description of the digital image representation which is already partially analyzed and/or in which features are detected in the digital image representation and stored in the form of the feature map,
wherein the digital image representation is a combination of raw image data and the feature compilation, and
wherein detection of traffic lanes and/or roadway markings is performed only after the bird's eye view transformation and the consolidation of steps b) and c).

8. An object detection apparatus for a vehicle, which is configured to detect at least one traffic lane and/or a roadway marking in at least one digital image representation based on sensor data obtained from at least one environmental sensor of a system of a vehicle, comprising:
an object detection system configured to perform the following:
a) obtaining a plurality of digital image representations each containing a plurality of features representing respective image content;
b) applying a bird's eye view transformation to the obtained digital image representations, wherein each of the digital image representations is transformed separately so as to create transformed digital image representations; and
c) performing a consolidation of the transformed digital image representations to obtain a consolidated digital image representation;
wherein each of the digital image representations includes a feature compilation or is provided as the feature compilation, so that an artificial neural network is used to process the feature compilation, so that the bird's eye view transformation is applied to the feature compilation,
wherein the feature compilation is a feature map, which is a description of the digital image representation which is already partially analyzed and/or in which features are detected in the digital image representation and stored in the form of the feature map,
wherein the digital image representation is a combination of raw image data and the feature compilation, and
wherein detection of traffic lanes and/or roadway markings is performed only after the bird's eye view transformation and the consolidation of steps b) and c).

* * * * *